(12) United States Patent
Galbreath et al.

(10) Patent No.: US 8,215,714 B2
(45) Date of Patent: Jul. 10, 2012

(54) VEHICLE SEAT ASSEMBLY WITH INTERLOCKING LAYERED SEATING SYSTEM

(75) Inventors: Ashford A. Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 179 days.

(21) Appl. No.: 12/781,401

(22) Filed: May 17, 2010

(65) Prior Publication Data
US 2011/0278902 A1 Nov. 17, 2011

(51) Int. Cl.
A47C 7/18 (2006.01)
A47C 7/24 (2006.01)

(52) U.S. Cl. ............... 297/452.27; 297/452.48

(58) Field of Classification Search ............. 297/452.27, 297/452.48
See application file for complete search history.

(56) References Cited

U.S. PATENT DOCUMENTS

| | | | |
|---|---|---|---|
| 3,222,697 A * | 12/1965 | Scheermesser | 297/452.48 X |
| 4,060,280 A | 11/1977 | Van Loo | |
| 4,115,170 A * | 9/1978 | Sanson | 297/452.27 X |
| 4,814,036 A | 3/1989 | Hatch | |
| 5,405,178 A * | 4/1995 | Weingartner et al. | 297/452.48 |
| 5,499,413 A | 3/1996 | Van Hekken | |
| 5,564,144 A | 10/1996 | Weingartner et al. | |
| 5,669,799 A | 9/1997 | Moseneder et al. | |
| 5,702,159 A | 12/1997 | Matsuoka et al. | |
| 6,018,832 A | 2/2000 | Graebe | |
| 6,896,954 B2 | 5/2005 | Omori et al. | |
| 6,964,453 B1 * | 11/2005 | Flegal et al. | 297/452.6 |
| 7,090,911 B2 * | 8/2006 | Lascelles | 428/163 |
| 7,134,730 B2 * | 11/2006 | Flegal et al. | 297/452.6 |
| 7,445,292 B2 * | 11/2008 | Moule | 297/452.27 X |
| 7,585,030 B2 * | 9/2009 | Galbreath et al. | 297/452.27 |
| 7,837,271 B2 * | 11/2010 | Galbreath et al. | 297/452.48 |
| 7,905,552 B2 * | 3/2011 | Galbreath et al. | 297/452.27 |
| 7,946,649 B2 * | 5/2011 | Galbreath et al. | 297/218.1 |
| 7,967,389 B2 * | 6/2011 | Galbreath et al. | 297/452.48 |
| 2002/0017733 A1 | 2/2002 | Kobayashi et al. | |
| 2002/0179469 A1 | 12/2002 | Tornga et al. | |
| 2003/0131400 A1 | 7/2003 | Clavell | |
| 2006/0022505 A1 | 2/2006 | Pyzik et al. | |
| 2008/0018162 A1 * | 1/2008 | Galbreath et al. | 297/452.48 |
| 2008/0136240 A1 | 6/2008 | Matthews et al. | |
| 2008/0290555 A1 | 11/2008 | Kim et al. | |
| 2009/0085384 A1 | 4/2009 | Galbreath et al. | |
| 2009/0146472 A1 | 6/2009 | Galbreath et al. | |
| 2009/0295215 A1 | 12/2009 | Galbreath et al. | |
| 2009/0302664 A1 | 12/2009 | Galbreath et al. | |
| 2010/0026076 A1 | 2/2010 | Partington et al. | |

FOREIGN PATENT DOCUMENTS

WO 2010014110 A1 2/2010

* cited by examiner

*Primary Examiner* — Rodney B White
(74) *Attorney, Agent, or Firm* — Brooks Kushman P.C.

(57) ABSTRACT

A vehicle seat transitional composite with a structural reinforcement member adapted to be mounted within a vehicle seat to provide support to an occupant. The structural reinforcement member has at least two edge regions and an inner region at least partially bound within the at least two edge regions. The at least two edge regions have a plurality of keying apertures. A compliant layer is adjacent to the structural reinforcement member and has a plurality of projections sized to be received within the plurality of keying apertures of the structural reinforcement member for minimizing lateral movement of the compliant layer relative to the structural reinforcement member.

11 Claims, 2 Drawing Sheets

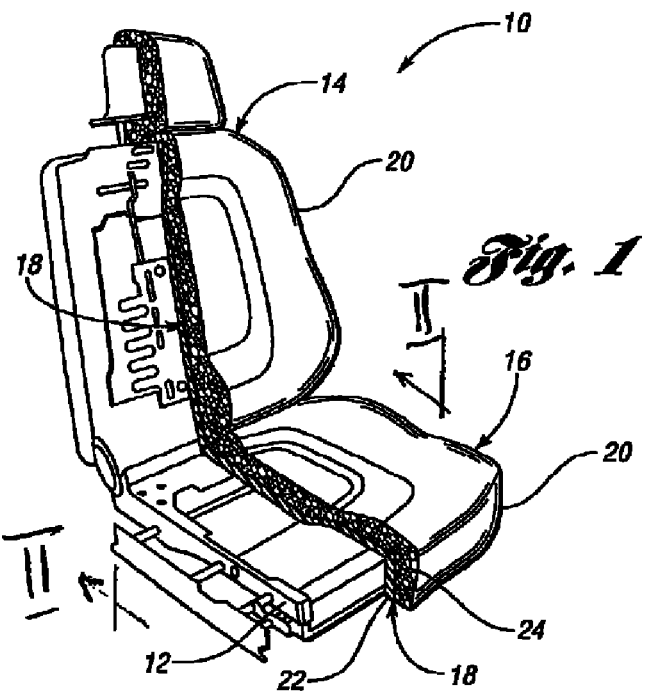
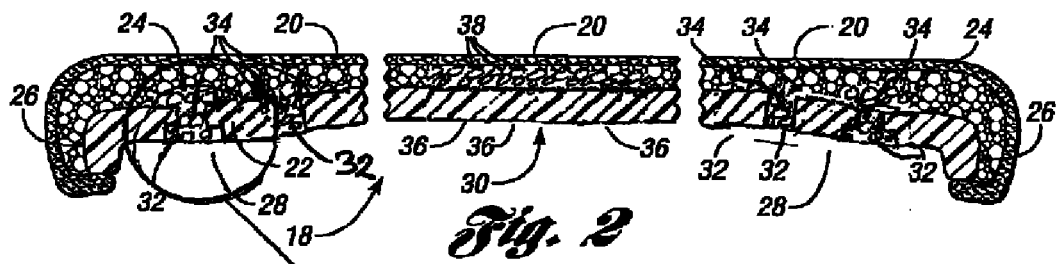
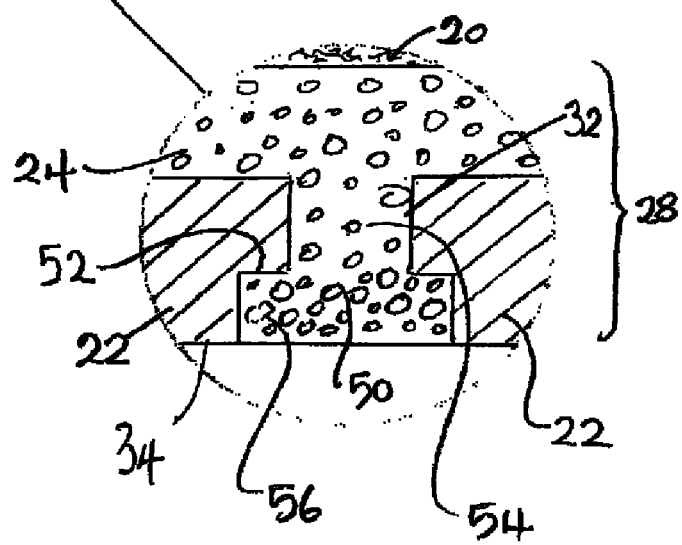

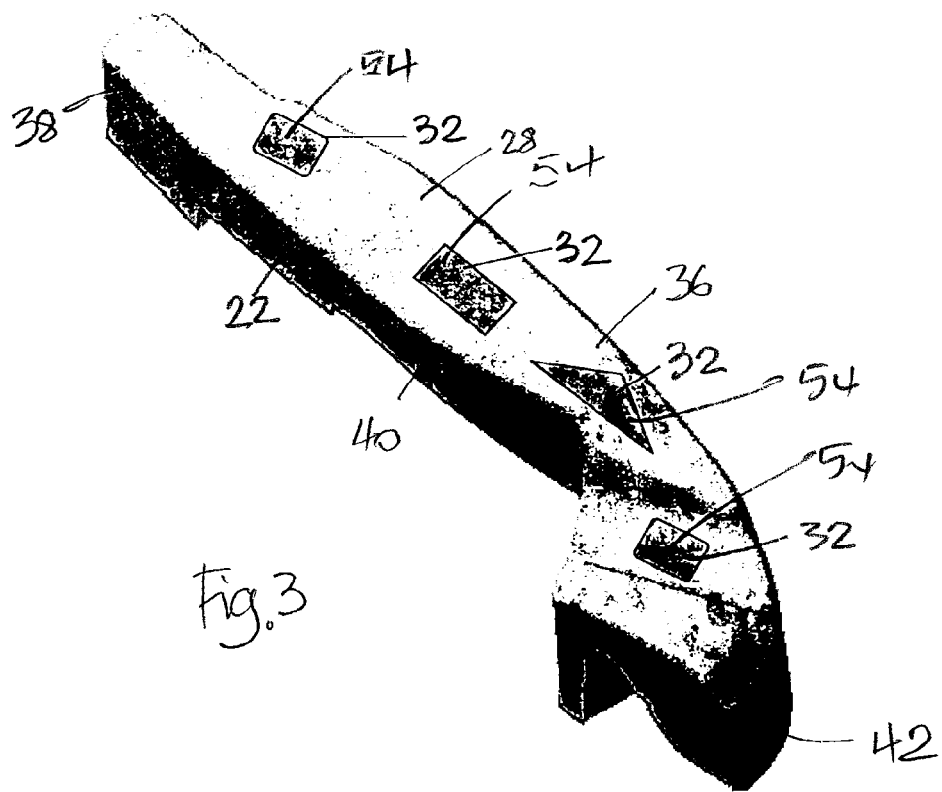
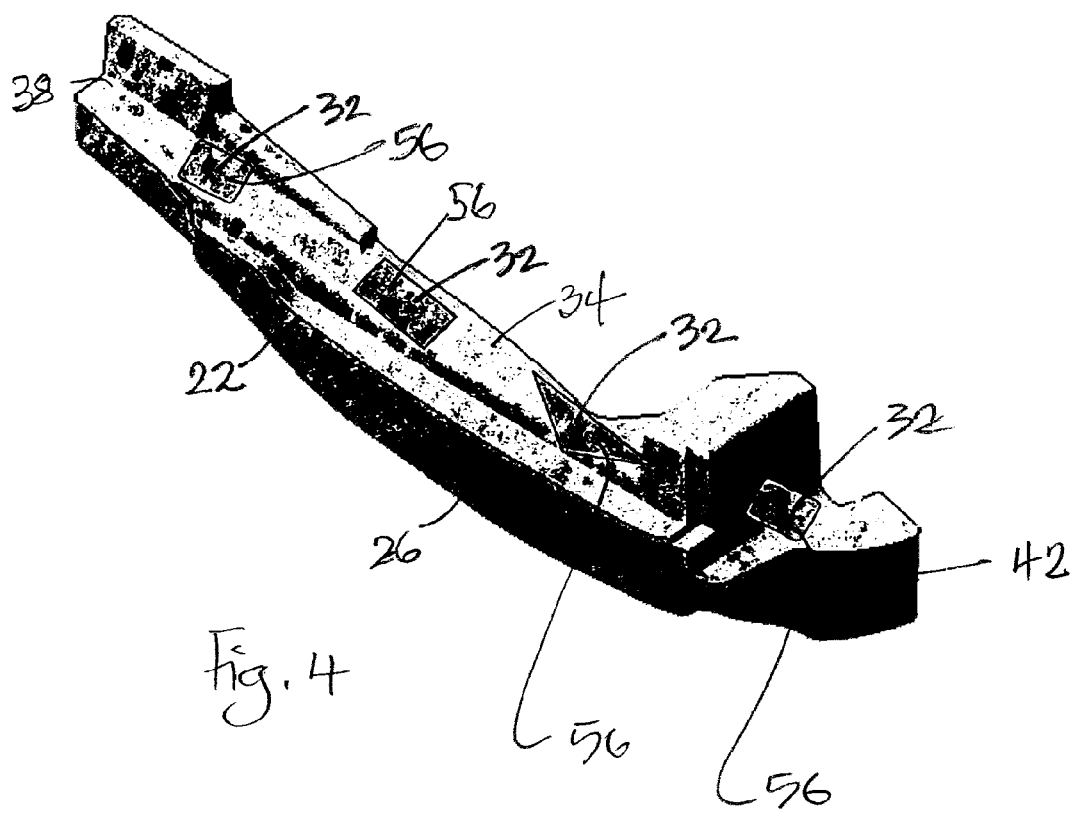

VEHICLE SEAT ASSEMBLY WITH INTERLOCKING LAYERED SEATING SYSTEM

BACKGROUND

1. Technical Field

Multiple embodiments relate to a vehicle seat assembly with an interlocking layered seating system.

2. Background Art

Most seat assemblies include three fundamental components: (a) a frame to support the seat assembly and mount it to a body, such as a vehicle; (b) a transition layer—often a foam cushion to cover the frame; and (c) cover material to cover the transition layer and provide a durable surface for contact with a seat assembly occupant.

There is a need for a durable vehicle seat assembly which provides lateral support to the occupant, while being environmentally friendly, structurally sound and comfortable, and relatively easy to assemble and disassemble.

SUMMARY OF INVENTION

Some aspects of this disclosure relate to inserting a molded higher rigidity material within a molded seating system foam pad. This offers a transition between a soft foam pad and a hard metal frame. One result is a vehicle seat assembly that has an interlocking layered seating system which improves ingress/egress durability performance, especially in high profile bolster designs, such as those found in sports car seating.

Another aspect of the disclosure relates to providing a transition layer—a stronger foam structure, such as by use of expanded polypropylene (EPP) that mates in some embodiments with the frame and is contoured for comfort.

Thus, one consequence of deploying the disclosed interlocking layered seating system is to provide a cost-effective means of protecting high profile bolsters from excessive wear in prolonged use. Optionally, the system at least partially replaces wire frames that traditionally may be molded in the foam or attached to the frame to re-enforce softer polyurethane-(PUR) foam in the bolster region of a seat.

BRIEF DESCRIPTION OF THE DRAWINGS

FIG. 1 is a schematic cut-away perspective view of an embodiment of a vehicle seat assembly;

FIG. 2 is a cross-sectional view of a portion of an embodiment of the vehicle seat assembly taken along the line II-II of FIG. 1;

FIG. 2A enlarges a portion of FIG. 2;

FIG. 3 is a perspective view of a top portion of an embodiment of a reinforcement member in the seat assembly of FIG. 1; and FIG. 4 is a perspective view of a bottom portion of the reinforcement member of FIG. 3.

DETAILED DESCRIPTION OF EMBODIMENTS

As required, detailed embodiments of the invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in the description are to be understood as modified by the word "about" in describing the broader scope of the invention. Practice within the numerical limits stated is generally preferred. Also, unless expressly stated to the contrary, the description of a group or class of materials that is suitable or preferred for a given purpose in connection with the invention implies that mixtures of any two or more members of this group or class may be equally suitable or preferred.

Referring to FIGS. 1-2, a vehicle seat assembly 10 is illustrated. While the vehicle seat assembly 10 as illustrated in FIG. 1 is a bucket seat assembly, it should be understood that the principles of the invention are applicable to other types of seat assemblies, such as bench, captain and other types of seat assemblies. It should also be understood that the principles of the present invention are applicable to other configurations in which foam is a component, such as backrests, back support pads, armrests, and head restraints. Still further, it should be understood that the principles of this invention are applicable to all types of vehicle seat assemblies. Furthermore, it should be understood that the teachings of the multiple embodiments are not limited to applications on automobiles but may be employed on any type of vehicle including, without limitation, aircraft, watercraft, spacecraft, and other types of landcraft including trains as well as non-vehicle seat assemblies.

As shown in FIG. 1, the vehicle seat assembly 10 includes a seat frame, generally indicated by the reference numeral 12 having a plurality of mounting brackets that secure the seat frame 12 within a vehicle. The vehicle seat assembly 10 also includes a seat back, generally indicated at 14 and a lower seat assembly, generally indicated at 16. In at least the illustrated embodiment, the seat back 14 and the lower seat assembly 16 each have a transitional composite 18 that is girded by a cover material 20. However, it should be understood that the configuration of the transitional composite 18 for the seat back 14 can differ from the configuration of the transitional composite 18 of the lower seat assembly 16. Likewise, it should be understood that the cover material 20 for the seat back 14 can differ from the cover material for the lower seat assembly 16.

The transitional composite 18 includes one or more structural reinforcement members 22 (FIGS. 1, 2, 2A), in at least the illustrated embodiments. The composite 18 is disposed over the frame 12. One or more compliant (foam) layers 24 are disposed over a given structural reinforcement member 22.

While a structural reinforcement member 22 can have any suitable size and configuration, in at least one embodiment, the structural reinforcement member 22 has an average thickness of five to one hundred millimeters, in other embodiments of twenty to seventy millimeters, and in yet other embodiments of thirty to fifty millimeters.

With reference now to FIG. 2, a cross-sectional view of an embodiment of the transitional composite 18 is illustrated that is girded by a cover material 20. As illustrated, the structural reinforcement member 22 of the transitional composite 18 has edges 26. Edge regions 28 are provided proximate the edges 26 of the structural reinforcement member 22. Between the edge regions 28 is an inner region 30. As illustrated, the inner region 30 is bound on one to four sides by the foam edge regions 28. The edge regions 28 may each have widths of five to ten centimeters in one embodiment. In another embodiment, the edge regions 28 may have widths of ten to twenty centimeters. The edge regions 28 may have similar or varying widths.

At least some of the edge regions 28 of the structural reinforcement member 22 have a plurality of keying apertures 32 formed therein (see FIG. 2A). In the embodiments of FIGS. 3-4, four keying apertures 32 are formed in a depicted reinforcement member 22. Of course, any suitable number of keying apertures 32 or reinforcement members 22 are contemplated within the scope of the disclosed embodiments.

If assembled as separate pieces during seat system assembly, the keying apertures 32 receive protrusions 54 (wherein foam is attached to the frame and covered with a trim layer) that extend from the compliant layer 24. (See FIGS. 2 and 2A.) The protrusions 50 of the compliant layer 24 facilitate proper installation of the compliant layer 24 relative to the structural reinforcement member 22 because the protrusions 50 fit into the keying apertures 32 within the structural reinforcement member 22. Interference fit, optionally including a taper, may be employed between the keying apertures 32 and the protrusions 50 to retain the protrusions 50 within the keying apertures 32.

Thus, the structural reinforcement member 22, in some embodiments, includes one or more foam-in-place, mechanically interlocking projections 50 that extend from the compliant layer 24. In FIGS. 2, 2A mechanical interlocking between the compliant or cushion layer 24 and the stiffer reinforcement member 22 is enabled by forming a keying aperture 32 that may include a interstitial portion 52 (FIG. 2A), that separates a neck 54 and a head portion 56.

One way to assemble the transitional composite 18 that extends between the seat frame 12 and the seat cover 20 is to use a low pressure injection process and placing the insert in the mold. In such a process, foam will pass through the keying apertures 32, and spread outwardly to form the interstitial portion 52 and the head portion 56, thus creating a button-like projection that mechanically interlocks the foam—e.g., polyurethane (PUR)—and the harder—e.g., expanding prolypropylene (EPP)—material of which the reinforcement member 22 may be made.

One way to manufacture the transitional composite 18 is, for example, to place one or more reinforcement members 22 (FIGS. 3-4) within a lower portion of a mold, with a lower face 34 projecting upwardly. A mixture of chemicals, including, for example, blend of polyol and an isocyanate-based catalyst are then injected into the mold before its lid is closed. When the added chemicals react, they become intermixed and expand, thus filling the mold and the keying apertures 32. With primary reference to FIGS. 2A and 3-4, the fluid reagents enter the neck portion 54 of a given keying aperture 32 before flowing across the interstitial portion 52 and occupying a head portion 56 of the keying aperture 32 that mates with the mechanically interlocking projection 50. If desired, vent holes can be provided in the mold. Preferably, the vent holes allow gasses such as carbon dioxide to escape, which tends to allow bubbles to be formed in the PUR foam. Such vent holes may be positioned opposite the head portion 56 of one or more mechanically interlocking projections 50. It will be appreciated that FIG. 2A depicts one mold orientation in which the B surface 34 is uppermost. Preferably, when the head portion 56 is formed, a flat B surface results.

When the transitional composite 18 is in use to support an occupant, the protrusions 50 facilitate alignment of the compliant layer 24 relative to a structural reinforcement member 22 and minimize lateral movement of the compliant layer 24 relative to the structural reinforcement member 22. Reducing lateral movement of the compliant layer 24 helps safeguard the integrity of the transitional composite 18 while promoting occupant comfort and minimizing seating trim wear.

Additionally, locating the keying apertures 32 in the edge regions 28 of the structural reinforcement member 22 provides retention during occupant ingress and egress as the occupant promotes lateral movement of the compliant layer 24 relative to the structural reinforcement member 22. Lateral movement may otherwise occur during occupant ingress or egress or during normal riding conditions when the occupant is on the transitional composite 18.

In addition to keying apertures 32 provided in the edge regions 28 of the structural reinforcement member 22, keying apertures 32 may be provided within the inner region 30 that is provided between the edge regions 28.

The keying apertures 32 may have various, similar and/or equal depths, while the protrusions 50 have corresponding lengths. As illustrated, the keying apertures 32 may have increased depths proximate to the edge 26 of the structural reinforcement member 22 to facilitate retention of the compliant layer 24 on the structural reinforcement member 22 during occupant ingress and egress, during normal riding. In some cases, depth equals distances from the edge. In one embodiment, at least one of the keying apertures 32 has a depth of approximately five to twenty-five millimeters. A depth of approximately five to twenty-five millimeters facilitates retention of a similarly sized protrusion 50 within the mating keying aperture 32. In one embodiment, at least one of the keying apertures 32 has a depth of approximately ten millimeters. In another embodiment, at least one of the keying apertures 32 has a depth of approximately fifteen millimeters. In yet another embodiment, at least one of the keying apertures 32 has a depth of approximately twenty millimeters. Of course, any suitable depth for the keying apertures 32 is contemplated within the scope of the multiple disclosed embodiments.

In FIG. 3, the keying apertures 32 provided in the edge regions 28 of the structural reinforcement member 22 and the keying apertures 32 provided within the upper region 36 of the structural reinforcement member 22 are illustrated. In the depicted embodiment, the keying apertures 32 have a profile that may be round, oval, elliptical or polygonal (including triangular, square, rectangular, pentagonal, hexagonal, etc). The keying apertures 32 facilitate retention of the compliant layer 24, as depicted in FIG. 2, because during occupant ingress and egress, the protrusions 34 remain locked within the keying apertures 32, at least some of which may have an interlocking fit provided there between.

In the illustrated embodiment, multiple keying apertures 32 are formed within the structural reinforcement member 22. Providing multiple keying apertures 32 may spread the related loads and increase retention of the protrusions 34 within the keying apertures 32.

The seat frame 12 may be constructed from any materials suitable for application within a vehicle seat assembly 10, such as aluminum, steel or other metal alloy, composite material, or a suitable polymer. Further, the seat frame 12 may be manufactured using techniques commonly known in the art, and relative to the type of material employed. By way of example, the manufacturing techniques may include stamping, welding, fastening or molding a suitable material to form the seat frame 12.

The structural reinforcement member 22 can be any suitable structural foam material. In at least one embodiment, suitable structural materials will have a rigidity that is higher than conventional polyurethane foam. It will be appreciated that structural foam density can be higher or lower than that of soft foam. But in at least one embodiment, suitable structural foam materials have a density of at least 1.75 pounds per cubic foot (pcf), and less than 7.0 pcf. In at least another embodiment, the suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 Newtons (N), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 pounds per square inch (psi), in at least another embodiment of 30 to 80 psi, and in at least another embodiment of 35 to 65 psi, as measured in accordance with ASTM test method No. D3574.

Optionally, the structural reinforcement member 22 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from Createch LTD.

Expanded polyolefins can be prepared by a bead polymerization process in which relatively small uniform beads of polymer are produced, containing a gas which is later utilized to effect blowing during the molding process. The most commonly used gas is air, although other gases including low boiling point liquids which produce gases at the molding temperatures may be used. Suitable gases include, but are not limited to air, nitrogen, carbon dioxide, pentene and the like.

The compliant layer 24 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 kilopascals (KPa), in another embodiments of 20 to 28 KPa, and in yet other embodiments of 23-26 KPa. Hysteresis of the cushion material can be measured by ASTM test method No. D3574.

In certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam. The compliant layer 24 can be any suitable size and shape, however, in at least one embodiment, the compliant layer 24 has an average thickness of twenty to one hundred millimeters, and in at least another embodiment of thirty to seventy millimeters, and in still yet other embodiments of forty to sixty millimeters. The compliant layer 24 may be a seat component that is provided adjacent to the seat body, which may be the structural reinforcement member 22.

As discussed, the vehicle seat assembly 10 also includes cover material 20 which is adapted to engage the transitional composite 18 in a covering relationship. The cover material 20 may include any material known in the art. By way of example, some of the known materials include cloth, leather or polymers of sufficient quality and thickness for use in seat cover applications. Polymer cover materials may include a flexible close cell polymer skin material such as polyvinyl, polyvinyl chloride (PVC), polyester, nylon, thermoplastic olefin (TPO) or thermoplastic urethane (TPU). Additional materials for use as cover material 20, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (generally known in the art) such as fiberglass, nylon, polyester or natural fibers, or a blend thereof, may be applied to the foam backing or back of the cover material 20 for increase in strength. In at least one particularly preferred embodiment, the cover material 20 comprises polyester or nylon cover material having polyester or nylon cover fastener clips for securing the cover material 20 to one or more components (i.e., cushion 18 and/or frame 12) of the vehicle seat assembly 10.

When the compliant layer 24 is mounted to the structural reinforcement member 22, the compliant layer 24 can move laterally relative to the structural reinforcement member 22. Often adhesives velcro, and/or other bonding materials are employed to mount the compliant layer 24 to the structural reinforcement member 22 in order to reduce lateral movement of the compliant layer 24. Utilization of adhesives velcro, and/or other bonding materials requires additional material to be added to the transitional composite 18, which increases manufacturing costs by requiring additional material and requiring additional manufacturing time.

Here are the reference numerals and corresponding parts that are used herein:
  10 vehicle seat assembly
  12 seat frame
  14 seat back
  16 lower seat assembly
  18 transitional composite
  20 seat cover
  22 reinforcement member
  24 compliant layer
  26 edge of 22
  28 edge region
  32 keying aperture
  34 lower face of 22
  36 upper face of 22
  38 aft region
  40 intermediate region
  42 forward stabilizer region
  44 inboard edge region
  46 outboard edge
  48 stabilizer support region
  50 mechanically intrlocking projection 52 interstitial portion
54 neck
56 head portion
58 annular recess While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle seat transitional composite positioned between a seat frame and a cover, the transitional composite comprising:
    at least one structural reinforcement member adapted to be mounted within a vehicle seat to provide support to an occupant, the structural reinforcement member having at least two keying apertures that extend there through; and
    a compliant layer situated in interlocking cooperation with the at least one structural reinforcement member, the compliant layer having a plurality of projections sized to be received within the at least two keying apertures of the structural reinforcement member for minimizing lateral movement of the compliant layer in relation to the structural reinforcement member;
    wherein one of the at least one structural reinforcement members has a lower face that lies toward the seat frame, an upper face that lies toward the cover, an aft region, an intermediate region and a forward stabilizer region, the at least two keying apertures extending between the upper and lower faces of the structural reinforcement member;
    wherein the plurality of projections of the compliant layer are received at least partially within the at least two keying apertures of the structural reinforcement member, and
    wherein one structural reinforcement member has an inwardly extending curvilinear stabilizer supporting region proximate the forward stabilizer region.

2. The vehicle seat transitional composite of claim 1 wherein at least some of the at least two keying apertures of the at least one structural reinforcement member have a cross sectional configuration selected from the group consisting of a circle, an ellipse, an oval, a polygon and combinations thereof.

3. The vehicle seat transitional composite of claim 2 wherein the plurality of projections have an average length of at least five millimeters.

4. The vehicle seat transitional composite of claim 1 wherein the at least two keying apertures have an average cross section of at least five millimeters in diameter.

5. The vehicle seat transitional composite of claim 1 wherein the seat has inboard and outboard edge regions, the at least one structural reinforcement member being positioned adjacent to the inboard and outboard edge regions.

6. The vehicle seat transitional composite of claim 1 wherein one structural reinforcement member has a stiffness or hardness greater than that of the compliant layer.

7. The vehicle seat transitional composite of claim 1 wherein the plurality of projections are retained within the at least two keying apertures with an interference fit.

8. A vehicle seat transitional composite comprising:
    a structural reinforcement member adapted to be mounted within a vehicle seat to provide support to an occupant, the structural reinforcement member having at least two edge regions and an inner region provided between the at least two edge regions, the at least two edge regions having at least one keying aperture formed therein; and
    a compliant layer provided adjacent to the structural reinforcement member, the compliant layer having at least one interlocking projection sized to be received within the at least one keying aperture of the structural reinforcement member for minimizing lateral movement of the compliant layer relative to the structural reinforcement member proximate the edge regions.

9. The vehicle seat transitional composite of claim 8 wherein the structural reinforcement member further comprises foam-in-place mechanically interlocking projections from the compliant layer.

10. The vehicle seat transitional composite of claim 8 wherein one interlocking projection includes a shoulder portion, a neck and a head portion, the head portion having an average diameter that exceeds that of the neck.

11. The vehicle seat transitional composite of claim 10 wherein one of the keying apertures of the structural reinforcement member includes an annular recess adjacent a bottom surface thereof, so that the head portion of the projection is seated in the annular recess following flow of the compliant layer through the keying aperture in an in-molding step.

* * * * *